(12) United States Patent
Bouwens

(10) Patent No.: US 11,425,277 B2
(45) Date of Patent: Aug. 23, 2022

(54) METHOD OF MANUFACTURING DECORATIVE PANELS

(71) Applicant: AGFA NV, Mortsel (BE)

(72) Inventor: Luc Bouwens, Mortsel (BE)

(73) Assignee: AGFA NV, Mortsel (BE)

( * ) Notice: Subject to any disclaimer, the term of this patent is extended or adjusted under 35 U.S.C. 154(b) by 321 days.

(21) Appl. No.: 16/652,748

(22) PCT Filed: Oct. 1, 2018

(86) PCT No.: PCT/EP2018/076658
§ 371 (c)(1),
(2) Date: Apr. 1, 2020

(87) PCT Pub. No.: WO2019/068646
PCT Pub. Date: Apr. 11, 2019

(65) Prior Publication Data
US 2020/0236249 A1  Jul. 23, 2020

(30) Foreign Application Priority Data
Oct. 2, 2017  (EP) ...................................... 17194351

(51) Int. Cl.
*H04N 1/405* (2006.01)
*B41J 3/407* (2006.01)
(Continued)

(52) U.S. Cl.
CPC .............. *H04N 1/405* (2013.01); *B41J 3/407* (2013.01); *B44F 9/02* (2013.01); *G06K 15/105* (2013.01)

(58) Field of Classification Search
CPC ........... H04N 1/405; B41J 3/407; B44F 9/02; G06K 15/105
See application file for complete search history.

(56) References Cited

U.S. PATENT DOCUMENTS

| 4,952,277 A | 8/1990 | Chen et al. |
| 6,128,099 A | 10/2000 | Delabastita |

(Continued)

FOREIGN PATENT DOCUMENTS

| EP | 1 592 226 A1 | 11/2005 |
| EP | 1 711 353 B1 | 12/2009 |

(Continued)

OTHER PUBLICATIONS

Official Communication issued in International Patent Application No. PCT/EP2018/076658, dated Nov. 27, 2018.

(Continued)

*Primary Examiner* — Quang N Vo
(74) *Attorney, Agent, or Firm* — Leydig, Voit & Mayer, Ltd.

(57) ABSTRACT

A method for manufacturing decorative panels includes rendering a wood pattern on a paper with a marking device to form a decorative layer before resin impregnation and heat pressing, wherein the marking device includes M inks and N inkjet printhead units. The rendering is performed in a plurality of passes in which each inkjet printhead unit includes the M inks, and the rendering step includes generating N sub-images in which an intensity of each pixel in the wood pattern equals the sum of intensities of corresponding pixels from the N sub-images, and the intensity of a pixel from a first sub-image from the N sub-images is a first percentage between 1 and 99 of the intensity of corresponding pixel in the wood pattern, and the intensity of a corresponding pixel from a second sub-image from the N sub-images is a second percentage between 1 and 99 of the intensity of corresponding pixel in the wood pattern.

15 Claims, 2 Drawing Sheets

(51) Int. Cl.
  *B44F 9/02* (2006.01)
  *G06K 15/10* (2006.01)

(56) References Cited

U.S. PATENT DOCUMENTS

| | | |
|---|---|---|
| 6,709,764 B1 | 3/2004 | Perrin et al. |
| 6,773,799 B1 | 8/2004 | Persson et al. |
| 2008/0036811 A1 | 2/2008 | Heydinger |
| 2008/0180475 A1 | 7/2008 | Eldar et al. |
| 2009/0208646 A1 | 8/2009 | Kreuder et al. |
| 2010/0192793 A1* | 8/2010 | Verhaeghe ............ B44C 5/0469 283/117 |
| 2011/0311806 A1 | 12/2011 | Meersseman et al. |
| 2013/0062006 A1 | 3/2013 | Meersseman et al. |
| 2015/0103380 A1 | 4/2015 | Donovan |

FOREIGN PATENT DOCUMENTS

| | | | |
|---|---|---|---|
| EP | 1 290 290 B1 | 1/2010 | |
| EP | 2 374 588 A1 | 10/2011 | |
| EP | 2 905 145 A1 | 8/2015 | |
| WO | 2006/136599 A1 | 12/2006 | |
| WO | 2011/069943 A1 | 6/2011 | |
| WO | 2012/126816 A1 | 9/2012 | |
| WO | 2013/050910 A2 | 4/2013 | |
| WO | 2015/104249 A1 | 7/2015 | |
| WO | 2015/118451 A1 | 8/2015 | |
| WO | WO-2015118451 A1 * | 8/2015 | ............... B05D 5/04 |
| WO | 2016/188745 A1 | 12/2016 | |

OTHER PUBLICATIONS

Vanhooydonck, "Method of Manufacturing Decorative Surfaces", U.S. Appl. No. 16/652,747, filed Apr. 1, 2020.

* cited by examiner

METHOD OF MANUFACTURING DECORATIVE PANELS

CROSS REFERENCE TO RELATED APPLICATIONS

This application is a 371 National Stage Application of PCT/EP2018/076658, filed Oct. 1, 2018. This application claims the benefit of European Application No. 17194351.7, filed Oct. 2, 2017, which is incorporated by reference herein in its entirety.

BACKGROUND OF THE INVENTION

1. Field of the Invention

The present invention to a method for manufacturing decorative panels, which comprises rendering wood pattern by inkjet technology to have a decorative surface that looks and feels as wood.

2. Description of the Related Art

Wood patterns are traditional printed by conventional printing technology such as offset or rotogravure printing in resolution above 1800 DPI (dots-per-inch) with several colored inks.

More and more, instead of analogue printing techniques, is digital printing technology tried for rendering the wood patterns by marking devices for manufacturing wood simulated decorative surfaces. The advantages of digital printing technology, such as inkjet printing are well known for short-run printing and the possibility of personalized wood simulated decorative surfaces. With laminate floor panels are wooden floor parts or parquetry imitated.

The wood pattern could be rendered in a plurality of passes for example by a marking device wherein an inkjet print head unit moves back and forth, while jetting, over a substrate to complete a rendered wood pattern for forming a decorative layer such as disclosed in WO215/104249 (AGFA GRAPHICS NV). The wood pattern may also be rendered in one pass, also called single pass, such as disclosed in WO2016/113190 (AGFA GRAPHICS) discloses a manufacturing method wherein the wood patterns are rendered in one pass. The rendering method in one pass is in detail disclosed in [0085].

When rendering a wood pattern in a plurality of passes by inkjet technology, it is found that it is a big challenge, due the plurality of passes, for rendering multiple copies of a wood pattern so that luminance, chroma and gloss of the background color, also called wood color, remain the same over the multiple copies. It is also found that rendering a wood pattern in a plurality of passes by inkjet print heads suffers of gloss artifacts; luminance artifacts and/or chroma artifacts appearing between two adjacent regions in the rendered wood pattern. These adjacent regions becomes visible in the decorative surface, also called decorative panels, and even more visible after constructing decorative surfaces to a whole, such as a floor wherein decorative surfaces are ordered next to each other. The adjacent regions are mainly elongated rectangular bands due the scan-movement of the inkjet printheads or substrate-movement. Luminance, chroma and gloss of the background color of the rendered wood patterns in these decorative tiles or panels are normally to be the same. If one tile or panel or a part of it, in the constructed floor, has a darker background color, other chroma or other gloss, this is immediately visible and not accepted by the floor owner.

It is found that these adjacent regions with differential gloss, luminance and/or chroma are even more accentuated and visible in a method of manufacturing decorative surfaces, comprising a step of heat pressing the rendered wood pattern on the substrate and an other substrate.

Therefore, there is a serious need to have a wood simulation method wherein in a wood pattern is rendered in a plurality of passes by inkjet technology for manufacturing a decorative surface wherein the chroma and gloss of the background color in the rendered wood pattern is not varying in adjacent regions inside the rendered wood pattern and between several copies of the rendered wood pattern and between several rendered wood patterns from the same wood type or wood image, such as light oak grey, bleached white oak, vintage oak, reclaimed chestnut brown or wood patterns with the same background color.

SUMMARY OF THE INVENTION

In order to overcome the problems described above, preferred embodiments of the present invention have been realised with a method of manufacturing decorative panels. Said manufacturing of decorative panels or surfaces comprises a method of rendering wood patterns, further called a wood simulation method; which is suitable for forming a decorative layer. Said decorative layer becomes the decorative part of a decorative panel after impregnation; applying core layer and heat-pressing. Said decorative panel is than a simulation of real wood.

Said heat pressing step makes that in the state-of-the-art when digital printed on paper for forming a decorative layer annoying differential gloss, luminance and/or chroma becomes visible, even it is not visible on the decorative layer.

The present invention is a method for manufacturing decorative panels, comprising the step: rendering a wood pattern ($W_{i,j}$) on a paper for forming a decorative layer by a marking device in a plurality of passes ($P_{1 \ldots L}$); and wherein said paper has a paper weight between 50 g/m2 and 130 g/m2 and a porosity according to Gurley's method (DIN 53120) between 8 and 20 seconds; and wherein the marking device comprises M inks ($I_{1 \ldots M}$) and N inkjet printhead units ($U_{1 \ldots N}$); wherein each inkjet printhead unit ($U_{i, i:1N}$) comprises the M inks ($I_{1 \ldots M}$); wherein the rendering step comprises:

generating N sub-images ($S_{1 \ldots N}$) wherein intensity of each pixel in the wood pattern ($W_{i,j}$) equals the sum of intensities of corresponding pixels from the N sub-images ($S_{1 \ldots N}$); and wherein intensity of a pixel from a first sub-image from the N sub-images ($S_{1 \ldots N}$) is a first percentage between 1% and 99% of the intensity of corresponding pixel in the wood pattern ($W_{i,j}$); and wherein intensity of corresponding pixel from a second sub-image from the N sub-images ($S_{1 \ldots N}$) is a second percentage between 1 and 99 of the intensity of corresponding pixel in the wood pattern ($W_{i,j}$); and halftoning each sub-image from the N sub-images ($S_{1 \ldots N}$), wherein minimum two sub-images are halftoned differently, preferably halftoned with different halftoning parameters and more preferably halftoned differently and independently from each other; and transferring each halftoned sub-image from the N halftoned sub-images to another inkjet printhead unit from the N inkjet printhead units ($U_{1 \ldots N}$)

jetting the N transferred halftoned sub-images in, thus during, the plurality of passes ($P_{1 \ldots L}$).

The N sub-images are a plurality of sub-images with an amount more than one (N≥2) sub-image; which is the same amount of inkjet printhead units ($U_{1 \ldots N}$). Each sub-image of the plurality of sub-images has the same dimension (width and height) as the wood pattern ($W_{i,j}$).

The M inks are a plurality of inks with an amount more than one (M≥2). By jetting the N transferred halftoned sub-images in the plurality of passes, the wood pattern ($W_{i,j}$) is marked on the substrate. Said decorative layer is than impregnated and heat pressed together with a core layer for forming a decorative panel.

The present invention includes also an embodiment of using a deco workflow system connected to a plurality of inkjet printhead units ($U_{1 \ldots N}$), thus N inkjet printhead units, rendering a wood pattern ($W_{i,j}$); which comprises a plurality of color channels, thus M color channels, one for each ink of a plurality of inks, thus M inks, and wherein each inkjet printhead unit comprises the plurality of inks, wherein the deco workflow system is able to do the same rendering step as in the previous embodiments. M and N are larger than one. The number of sub-images and thus also inkjet printhead units is preferably two to reduce the cost of the rendering system.

It is namely founded that there may be differences in droplet landings between the droplets jetted in the forth-movement and the droplets jetted in the back-movement by deflection of the beam where over the inkjet printhead units moves. It is found that there may be differences in droplet landings between a movement of a substrate by shrinking of the substrate between movement and jetting droplets. All small inaccuracies of droplet landings on the substrate causes bad dot-on-dot precision which results in gloss, luminance and/or chroma artefacts, especially in adjacent elongated regions in the rendered wood pattern. Said inaccuracies of droplet landings becomes highly visible, especially when the wood pattern is jetted with said pigmented aqueous inkjet ink on said paper, after heat pressing said resin impregnated decorative layer together with a core layer for forming said decorative panel. But the present invention reduces and solves these artefacts probably due to a better mixture of jetted droplets in the plurality of passes which is the result of the splitting of the wood pattern in a plurality of sub-images which are halftoned differently. The present invention results in an appearance of high value wood pattern and the manufacturing of high value wood surfaces, wherein the wood pattern is rendered on a low value substrate.

DETAILED DESCRIPTION OF THE PREFERRED EMBODIMENTS

Figure 1:
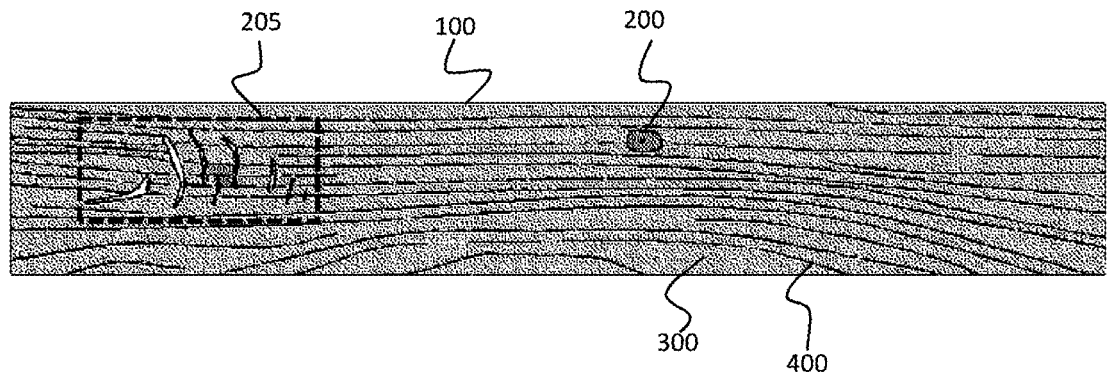
FIG. 1 discloses a wood pattern (100) comprising a plurality of dark lines, called wood nerves (400). The background color (300) of a wood pattern (100) is determined by the color from the spaces between the wood nerves. The wood pattern (100) comprises a knot (200) and some other wood imperfections (205).
Figure 2:
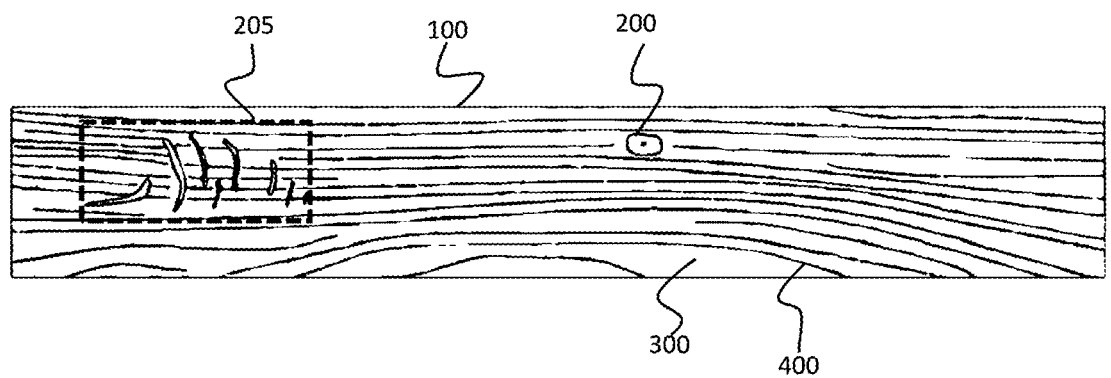
FIG. 2 discloses a wood pattern (100) comprising a plurality of dark lines, called wood nerves (400). The background color (300) of a wood pattern (100) is determined by the color from the spaces between the wood nerves. The background color (300) is lighter than in FIG. 1 (FIG. 1). The wood pattern (100) comprises a knot (200) and some other wood imperfections (205).
Figure 3:
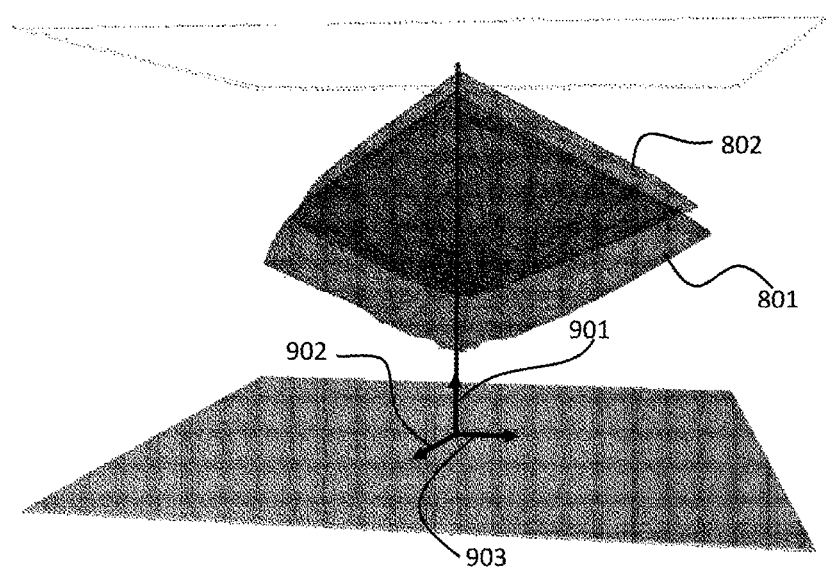
FIG. 3 discloses a first color gamut (801) and a second color gamut (802) wherein the first gamut is determined after heat-pressing according to a disclosed manufacturing method of decorative surfaces, namely wherein the substrate is paper, sucked in a thermosetting resin and heat pressed on HDF and the second gamut is determined before heat-pressing. This shows the tremendous colour gamut change after heat pressing. Both color gamuts (801, 802) are shown in CIELAB color space wherein a first axes (901) is for determining the L-value, also called luminance value, a second axes (903) for determining the a-value and a third axes (904) to determining the b-value. More information about CIELAB is disclosed on https://en.wikipedia.org/wiki/Lab_color_space#CIELAB.
Figure 4:
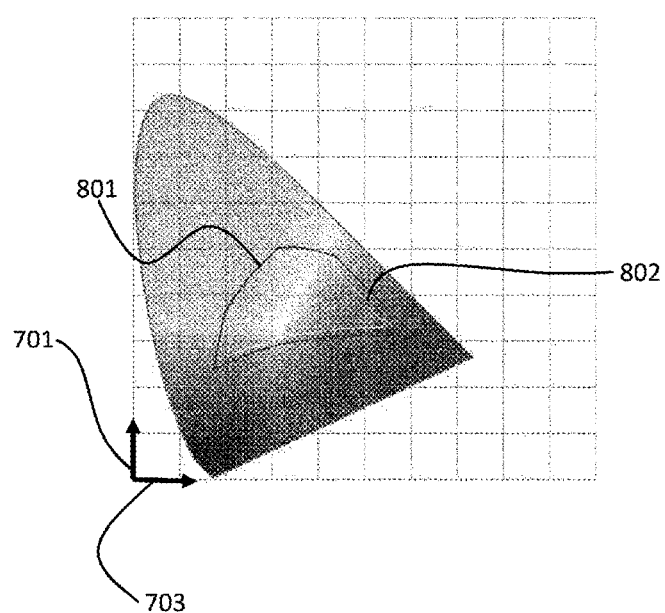
FIG. 4 discloses the first color gamut and the second color gamut as in FIG. 3 but displayed in xy chromaticity coordinates. More information about chromaticity coordinates is disclosed on https://en.wikipedia.org/wiki/Chromaticity.

The method of manufacturing decorative surfaces from the present invention comprises a step of heat pressing the rendered wood pattern on the substrate, namely the decorative layer and a core layer; after the impregnation of said decorative layer. The need of the present invention is in here very high because it is found that the color strength of the rendered wood pattern is enlarged and/or changed after heat-pressing whereby adjacent regions with gloss, luminance and/or chroma difference becomes accentuated, even there were not visible or measurable on the rendered wood pattern before the heat-pressing step.

The substrate in the present invention whereon said wood pattern is jetted is a paper and the core layer is preferable a wood-based layer for decorative laminates, as decorative surfaces, wherein the manufacturing comprises an additional step before and/or after rendering:

impregnating the paper by a thermosetting resin.

Thermosetting resin is preferably selected from the group consisting of melamine-formaldehyde based resins, ureum-formaldehyde based resins and phenol-formaldehyde based resins.

The substrate may comprise an inkjet-receiving layer, which preferably contains an inorganic pigment P and a polymeric binder B; and more preferably, wherein the pigment P is selected from the group consisting of alumina hydrates, aluminum oxides, aluminum hydroxides, aluminum silicates, and silicas. The wood pattern is than rendered on the inkjet-receiving layer. This inkjet-receiving layer is to prevent that the color strength of the wood pattern is not reduced due to the absorbing of the jetted inks in the substrate. Detailed information, including preferred embodiments, on this type of manufacturing decorative surfaces are disclosed below.

The substrate is preferably supported by a print table, more preferable a vacuum table wherein the substrate is held down against the support by vacuum pressure. The substrate is preferably supported by a conveyor belt, more preferably a vacuum belt wherein the substrate is held down against the support by vacuum pressure. By a set of air-channels in the vacuum table or vacuum belt a pressure differential is provided at the support by a connected vacuum chamber which is connected to one or more a vacuum pumps. The vacuum pressure guarantees the fixing and holding down of the substrate to have a good print quality and to minimize adjacent regions with gloss, luminance and/or chroma difference in the rendered wood pattern because small inaccuracies of droplet landings on the substrate causes bad dot-on-dot precision which results in gloss, luminance and/or chroma artefacts, especially in adjacent elongated regions in the rendered wood pattern.

The jetted N transferred halftoned sub-images may be dried by a dry unit comprising an UV source (ultra violet source) or an IR source (infra red source) or by absorption in the substrate. The IR source is preferably a NIR source (=Near Infra Red source) such as a NIR lamp. The IR source may comprise carbon infrared emitters which has a very short response time. An other IR source is a SWIR (=Short Wave Infra Red source).

In a preferred embodiment is the intensity of each pixel from the first sub-image a first percentage between 1 and 99 of the intensity of corresponding pixels in the wood pattern ($W_{i,j}$), thus the same percentage of the intensity for each pixel in the wood pattern ($W_{i,j}$).

The first percentage may be between 25 and 75 and more preferably, between 40 and 60 and most preferably the first percentage is substantially 50. The spreading of the intensities over the plurality of inkjet printhead units, has proven to be uniform or even better equal. The adjacent regions with gloss, luminance and/or chroma difference becomes less if the first percentage is narrower to a percentage of 50, especially when the color order between inkjet printhead units are mirrored to each other.

In a preferred embodiment is the amount of inkjet printhead units two. The wood pattern ($W_{i,j}$) is than in the generation step splitted in two sub-images and wherein thus the second percentage equals hundred percent minus the first percentage. More preferably is the intensity of each pixel from the first sub-image a first percentage between 1 and 99 of the intensity of corresponding pixels in the wood pattern ($W_{i,j}$).

This preferred embodiment could also formulated as:

$$\text{Intensity}(W_{ij}) = \text{Intensity}(S_{1,i,j}) + \text{Intensity}(S_{2,i,j})$$

$$\text{Intensity}(S_{1,i,j}) = P\% \times \text{Intensity}(W_{ij})$$

$$\text{Intensity}(S_{2,i,j}) = (100-P)\% \times \text{Intensity}(W_{ij})$$

wherein $W_{ij}$ is a value or set of values from pixel of the wood pattern, positioned on coordinates i,j
wherein $S_{1,i,j}$ is a value or set of values from corresponding pixel of the first sub-image, positioned on same coordinates i,j wherein $S_{2,i,j}$ is a value or set of values from corresponding pixel of the second sub-image, positioned on same coordinates i,j
wherein $1 < P < 100$,
more preferably wherein $25 < P < 75$
most preferably wherein $40 < P < 60$ or $P = 50$ Wood Image A wood image is an image, mainly a color image, representing wood and is achieved by suitable commercially available hardware, such as scanning a photograph or a wood piece or taking an image of a wood piece by a digital camera, and commercially available software, such as Adobe Photoshop™ to manipulate, such as color conversion by color management system (CMS), and to create wood images.

A wood image may be stored and/or loaded as one or more files on a memory of a computer. The embodiment may comprise a method to load a wood image into a memory of a computer.

A wood image, and also a wood pattern, are images, has typical characteristics wherein wood grain lines are elongated in a dominant direction, called the nerve direction and between these wood grain lines the tone of the wood image, also called the background color of the wood image, is determined. The elongated wood grain lines are lines, mainly dark lines, repeated with variances in frequency on top of the background color. This repeatability of these lines and spaces between these lines and color between these lines, even with variances, makes it hard to render wood patterns, which is solved by the wood simulation method in the present invention. Regions in the rendered wood pattern wherein this (pseudo-)repeatability is disturbed are not accepted by the customer because this becomes visible; especially when the disturbance occurs in a region and this disturbances does not occur in an adjacent region.

Examples how a percentage of intensity from a pixel can be formulated for a pixel of an wood pattern, defined in CMY (cyan, magenta en yellow):

$P\% \times \text{Intensity}(W_{ij})$ wherein pixel $W_{i,j}$ on the coordinates i,j of the wood pattern has a set of values $\{C_{i,j}, M_{i,j}, Y_{i,j}\}$ $$P\% \times \text{Intensity}(W_{ij}) = (P\% \times C_{i,j}, M_{i,j}, Y_i) \text{ or}$$

$$P\% \times \text{Intensity}(W_{ij}) = (P\% \times C_{i,j}, P\% \times M_{i,j}, (P\% \times Y_i)/2) \text{ or}$$

$$P\% \times \text{Intensity}(W_{ij}) = (P\% \times C_{i,j}, P\% \times M_{i,j}, P\% \times Y_i)$$

Examples to calculate a sum of intensities wherein pixel $\text{Img}_{1,i,j}$ on the coordinates i,j of a first image has a set of values $\{C_{1,i,j}, M_{1,i,j}, Y_{1,i,j}\}$ and wherein pixel $\text{Img}_{2,i,j}$ on the coordinates i,j of a second image has a set of values $\{C_{2,i,j}, M_{2,i,j}, Y_{2,i,j}\}$ $$\text{Intensity}(\text{Img}_{1,i,j}) + \text{Intensity}(\text{Img}_{2,i,j}) = \{C_{1,i,j} + C_{2,i,j}, M_{1,i,j} + M_{2,i,j}, Y_{1,i,j} + Y_{2,i,j}\}$$

Similar formulations may be used for wood patterns defined with other color channels.

Wood Patterns

The wood pattern ($W_{i,j}$) is a region-of-interest from a wood image so variances in wood patterns may be achieved by selecting different region-of-interests in the wood image. The variances of such wood patterns have a similar background color.

In the present invention, the wood pattern has preferably M color channels, one for each ink from the M inks. The rendering method may comprise an additional step wherein the wood pattern is converted from a certain colorant space (RGB, $\text{CMYK}_{offset}$) to another colorant space; which is defined by the M inks; so the converted wood pattern comprises M color channels one for each ink from the M inks or wherein the wood pattern is converted from a certain color space (CIELab, CIEXYZ) to another colorant space; which is defined by the M inks; so the converted wood pattern comprises M color channels one for each ink from the M inks. These conversion methods may be done in a color management system (CMS), comprised in a deco workflow system.

The content of a wood pattern is, similar as a wood image, preferable defined in raster graphics format but more preferably in vector graphics format, wherein the wood pattern as raster graphics format is embedded. A wood pattern may be stored and/or loaded as one or more files on a memory of a computer. The embodiment may comprise a method to load a wood pattern to a memory of a computer.

The tone in a wood pattern, also called background color of a wood pattern or wood color of a wood pattern, may be calculated by determining the color in a color histogram of the wood pattern, namely the color that dominates the most in the color histogram.

The contrast color of a wood pattern is a color in the wood pattern which has the highest color difference with the background color such as the highest delta E in CIELab. The colors in wood grain lines, wood pores and/or wood imperfections are in most wood patterns determined nearby the contrast color.

The wood grain lines are also called wood nerves. A higher frequency, sometimes called density, of wood grain lines may be caused by smaller growth rings in the wood that the wood image represents. The wood pattern may also comprise wood pores and/or wood imperfections such as knots and cracks.

The wood pattern may be divided in a sequence of bands and rendered in the sequence of bands to render the 'full' wood pattern. Each band of the sequence of bands comprises than a part of the wood pattern thus, each band is a wood pattern.

Deco Workflow System

To manage the rendering of wood patterns by one or more digital render devices in a method of manufacturing decorative surfaces, the embodiment may be performed by a deco workflow system, which for example carries out determining wood patterns, color converting of wood patterns, imposing or nesting a plurality of wood patterns on the substrate and/or digital cutting decorative surfaces comprising the rendered wood pattern.

Rendering is a stage comprising the step of halftoning an image and transferring the halftoned image to a marking device and marking the transferred halftoned image by the marking device. Halftoning, sometimes called screening is converting a continuous-tone bitmap into a halftone (pattern of dots). Two halftoning methods, also called halftoning types, are Amplitude Modulation (AM) screening and Frequency Modulation (FM) screening, also called stochastic screening.

In a preferred embodiment of the present invention are the minimum two sub-images halftoned by FM screening with each a different set of random-seeds. Each set of random random-seeds is thus a halftone parameter of the FM screening method. The set of random-seeds may comprise one random-seed but preferably one random-seed per color channel from the wood pattern. The wood pattern comprises in the present invention minimum M color channels one for each ink from the M inks.

The halftone parameters for each sub-image in the present invention is preferably selectable in the deco workflow system.

The deco workflow system comprises a halftoning unit for halftoning the sub-images of the present invention, preferably comprises a RIP (raster image processor) for rasterizing vector graphics, such as marks as explained above, in graphic files comprising the wood pattern and more preferably comprises additionally a color management system for converting wood images or wood patterns to the colors of the inks from the marking device.

The deco workflow system operates a program. Part or whole of the deco workflow system and/or the functional units or blocks thereof may be implemented in one or more circuits or circuitry, such as an integrated circuit(s) or as an LSI (large scale integration). Each functional unit or block of the deco workflow system may be individually made into an integrated circuit chip. Alternatively, part or whole of the functional units or blocks may be integrated and made into an integrated circuit chip.

A program, which is operated in the deco workflow system according to various preferred embodiments of the present invention, is a program controlling a processor in order to realize functions of the various preferred embodiments according to the present invention. Therefore, information which is handled by the deco workflow system is temporarily accumulated in a RAM at the time of the processing. Thereafter, the information may be stored in various types of circuitry in the form of ROMs and HDDs, and read out by circuitry within, or included in combination with, the deco workflow system as necessary, and modification or write-in is performed thereto. As a recording medium storing the program, any one of a semiconductor medium (for example, the ROM, a non-volatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer, which is connected through a network such as the Internet. In this case, a storage device of the server computer is also included in the present invention. In addition, a portion of a terminal device, a wireless base station, a host system, or other devices, or the whole thereof may be realized as an LSI, which is typically an integrated circuit. Each functional unit or block of the deco workflow system may be individually chipped, or a portion thereof, or the whole thereof may be chipped by being integrated. In a case of making each functional block or unit as an integrated circuit, an integrated circuit controller that controls the integrated circuits, is added.

Finally, it should be noted that the description referring to "circuit" or "circuitry" is in no way limited to an implementation that is hardware only, and as persons of ordinary skill in the relevant art would know and understand, such descriptions and recitations of "circuit" or "circuitry" include combined hardware and software implementations in which the circuit or circuitry is operative to perform functions and operations based on machine readable programs, software or other instructions in any form that are usable to operate the circuit or circuitry.

Decorative Laminates

A decorative laminate is preferably selected from the group consisting of kitchen panels, flooring panels, furniture panels, ceiling panels and wall panels.

Decorative laminates are constructed together for a large planar surface (see http://www.unilin.com/en/flooring), such as floor or wall, or for cupboards or sideboards, which comprises one or more large planar surfaces (see http://www.unilin.com/en/panels).

Adjacent regions with gloss, luminance and/or chroma difference in the rendered wood pattern may result after the construction as unacceptable because the customer wants a uniform background color in the whole construction. Any gloss, luminance and/or chroma difference in adjacent regions of a rendered wood pattern and adjacent decorative laminates should be avoided. This is the mean reason for using the present invention.

Manufacturing Decorative Laminates

The wood simulation method of the present invention is preferably included in a method for manufacturing decorative surfaces and more preferably a method for manufacturing decorative laminates. In a preferred embodiment a method of manufacturing decorative surfaces comprises the wood simulation method of the present invention and additional comprises a step of heat pressing the rendered wood pattern on the substrate and an other substrate more preferably wherein the substrate is a paper and the other substrate is a core layer, preferably a wood-based layer; and comprising an additional step, after or most preferably before rendering, impregnating the paper by a thermosetting resin.

The thermosetting resin is preferably selected from the group consisting of melamine-formaldehyde based resins, ureum-formaldehyde based resins and phenol-formaldehyde based resins; and the inkjet receiving layer preferably contains an inorganic pigment P and a polymeric binder B; and wherein the pigment P is selected from the group consisting of alumina hydrates, aluminum oxides, aluminum hydroxides, aluminum silicates, and silicas.

Detailed preferred embodiments and definitions are disclosed here after.

In a preferred embodiment of the method for manufacturing decorative laminates, a resin impregnated decorative layer; which comprises the rendered wood pattern $W_{(i,j)}$ is heat pressed between a core layer, preferably a wood-based layer, and a protective layer and cut into a decorative laminate selected from the group consisting of flooring, kitchen, furniture and wall panels.

In a preferred embodiment of the method for manufacturing decorative laminates, the decorative laminate includes a tongue and a groove capable of achieving a glue less mechanical join between decorative laminates.

Preferably the inkjet printing method of the invention is part of a DPL process, wherein the decorative layer is taken up in a stack to be pressed with the core layer and a protective layer, and preferably also a balancing layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

In a preferred embodiment, a protective layer containing a thermosetting resin is applied onto the rendered wood pattern ($W_{i,j}$), wherein the thermosetting resin may be a colored thermosetting resin to reduce the amount of inkjet ink to be printed. The preferred ink set is a pigmented aqueous inkjet ink set and not a pigmented free radical UV curable ink set because these are not very well compatible with the usage of thermosetting resin in this method.

The method of manufacturing a decorative surface preferably includes: providing a relief in at least the protective layer, more preferably by means of a short cycle embossing press. The embossing preferably takes place at the same time that the core layer, the decorative layer and the protective layer, and preferably one or more balancing layers, are heat-pressed together. The relief in the protective layer preferably corresponds to the rendered wood pattern ($W_{i,j}$).

A decorative laminate, may have a tongue and groove join and includes preferably at least a core layer, a decorative layer, comprising the rendered wood pattern ($W_{i,j}$), and a protective layer. In order to protect the colour image of the decorative layer against wear, a protective layer is applied on top of the decorative layer. A balancing layer may also be applied at the opposite side of the core layer to restrict or prevent possible bending of the decorative laminate. The assembly into a decorative laminate of the balancing layer, the core layer, the decorative layer and the protective layer is preferably performed in the same press treatment of preferably a DPL process (Direct Pressure Laminate).

In a preferred embodiment of decorative laminates, tongue and groove profiles are milled into the side of individual decorative laminates, which allow them to be slid into one another. The tongue and grove join ensures, in the case of flooring panels, a sturdy floor construction and protects the floor, preventing dampness from penetrating.

Core Layers for Decorative Laminates

The core layer is preferably made of wood-based materials, such as particle board, MDF or HDF (Medium Density Fibreboard or High Density Fibreboard), Oriented Strand Board (OSB) or the like. Use can also be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN).

The thickness of the core layer is preferably between 2 and 12 mm, more preferably between 5 and 10 mm.

Paper Substrates for Decorative Laminates

The decorative layer and preferably also the protective layer and the optional balancing layer, include paper as substrate.

The paper preferably has a weight of less than 150 g/m$^2$, because heavier paper sheets are hard to impregnate all through their thickness with a thermosetting resin. Preferably said paper layer has a paper weight, i.e. without taking into account the resin provided on it, of between 50 and 100 g/m$^2$ and possibly up to 130 g/m$^2$. The weight of the paper cannot be too high, as then the amount of resin needed to sufficiently impregnate the paper would be too high, and reliably further processing the printed paper in a pressing operation becomes badly feasible.

Preferably, the paper sheets have a porosity according to Gurley's method (DIN 53120) of between 8 and 20 seconds. Such porosity allows even for a heavy sheet of more than 150 g/m$^2$ to be readily impregnated with a relatively high amount of resin.

The paper for the decorative layer is preferably a white paper and may include one or more whitening agents, such as titanium dioxide, calcium carbonate and the like. The presence of a whitening agent helps to mask differences in colour on the core layer, which can cause undesired colour effects on the rendered wood pattern ($W_{i,j}$).

Alternatively, the paper for the decorative layer is preferably a bulk coloured paper including one or more colour dyes and/or colour pigments. Besides the masking of differences in colour on the core layer, the use of a coloured paper reduces the amount of inkjet ink required to rendered wood pattern ($W_{i,j}$). For example, a light brown or grey paper may be used for rendering a wood pattern ($W_{i,j}$) order to reduce the amount of inkjet ink needed.

Ink Receiving Layer for Decorative Laminates

One or more ink receiving layers may be present on the paper substrate of the decorative layer for enhancing the image quality.

The ink receiving layer(s) may be a purely polymer based ink receiving layer, but preferably contain an inorganic pigment and a polymeric binder. The inorganic pigment may be a single type of inorganic pigment or a plurality of different inorganic pigments. The polymeric binder may be a single type of polymeric binder or a plurality of different polymeric binders.

In a preferred embodiment, the ink receiving layer(s) have a total dry weight between 2.0 g/m² and 10.0 g/m², more preferably between 3.0 and 6.0 g/m2.

In a particularly preferred embodiment, the ink receiving layer(s) include a polymeric binder, preferably a water soluble polymeric binder (>1 g/L water at 25° C.), which has a hydroxyl group as a hydrophilic structural unit, e.g. a polyvinyl alcohol.

The inorganic pigment is preferably selected from the group consisting of alumina hydrates, aluminum oxides, aluminum hydroxides, aluminum silicates, and silicas.

The ink receiving layer(s) may include other additives, such as colorants, surfactants, biocides, antistatic agents, hard particles for wear resistance, elastomers, UV absorbers, organic solvents, plasticizers, light-stabilizers, pH adjusters, antistatic agents, whitening agents, matting agents and the like.

The ink receiving layer(s) may consist of a single layer or of two, three or more layers even having a different composition. The ink receiving layer(s) may be coated onto the support side of the substrate by any conventional coating technique, such as dip coating, knife coating, extrusion coating, spin coating, slide hopper coating and curtain coating. Alternatively, the ink receiving layer(s) can also be applied by a printing technique, such as flexographic printing, screen printing and inkjet printing technology such as valvejet printheads.

Said ink receiving layer(s) influences the color of the decorative layer when the decorative panel is formed in the heat press room.

Thermosetting Resins for Decorative Laminates

The thermosetting resin is preferably selected from the group consisting of melamine-formaldehyde based resins, ureum-formaldehyde based resins and phenol-formaldehyde based resins.

Most preferably the thermosetting resin is a melamine-formaldehyde based resin, often simply referred to in the art as a 'melamine (based) resin'.

The melamine formaldehyde resin preferably has a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapour bubbles to the surface, resulting in adhesion problems.

The paper is preferably provided with an amount of thermosetting resin equaling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

The paper is preferably provided with such an amount of thermosetting resin that at least the paper core is satisfied with the resin. Such satisfaction can be reached when an amount of resin is provided that corresponds to at least 1.5 or at least 2 times the paper weight.

Preferably the resin provided on said paper is in a so-called B-stage. Such B-stage exists when the thermosetting resin is not completely cross linked.

Preferably the resin provided on said paper has a relative humidity lower than 15%, and still better of 10% by weight or lower.

Preferably the step of providing said paper with thermosetting resin involves applying a mixture of water and the resin on the paper. The application of the mixture might involve immersion of the paper in a bath of the mixture and/or spraying or jetting the mixture. Preferably the resin is provided in a dosed manner, for example by using one or more squeezing rollers and/or doctor blades to set the amount of resin added to the paper layer.

Methods for impregnating a paper substrate with resin are well-known in the art as exemplified by WO 2012/126816 (VITS).

Said resin influences the color of the decorative layer at the forming of the decorative panel.

Pigmented Aqueous Inkjet Ink Sets

A pigmented aqueous inkjet ink set according to a preferred embodiment of the invention comprises:
a) a cyan aqueous inkjet ink containing a copper phthalocyanine pigment, preferably a β-copper phthalocyanine pigment;
b) a red aqueous inkjet ink containing a red pigment selected from the group consisting of C.I. Pigment Red 254, C.I. Pigment Red 122, C.I. Pigment Red 176 and mixed crystals thereof;
c) a yellow aqueous inkjet ink containing a pigment C.I Pigment Yellow 150 or a mixed crystal thereof; and
d) a black aqueous inkjet ink containing a carbon black pigment;
wherein the aqueous inkjet inks contain a surfactant.

In addition to specific colour pigments, the inkjet inks contain also a surfactant, preferably a fluorosurfactant. The surfactant allows for spreading on the décor paper, which enhances indirectly also the metamerism. In a preferred embodiment of the pigmented aqueous inkjet ink set, the pigmented aqueous inkjet inks have a static surface tension at 25° C. between 19.0 mN·m and 27.0 mN·m for good spreading on the décor paper.

The hue angle H* of a red inkjet ink is normally in the range of 15° to 65°. For providing good reproduction of wood colour images, the hue angle H* of a red inkjet ink in the present invention is preferably between 15° and 50°, more preferably between 20° and 40°. In a preferred embodiment of the pigmented aqueous inkjet ink set, the red pigment is C.I. Pigment Red 254 or a mixed crystal thereof. The hue angle H* is calculated in CIELab color space by the formula: $\tan^{-1}(b^*/a^*)$ (degree) wherein a* and b* are the chromaticity coordinates in the CIE Lab color space.

The hue angle of a yellow inkjet ink is usually in the range of 75° to 110°. For providing good reproduction of wood colour images, the hue angle H* of a yellow inkjet ink in the present invention is preferably between 80° and 105°, more preferably between 85° and 95°. In a preferred embodiment of the pigmented aqueous inkjet ink set, the hue angle H* of the yellow aqueous inkjet ink is higher than 85°, more preferably between 86° and 98°, and most preferably between 87° and 95°.

The pigmented aqueous inkjet inks in the ink set should preferably also have a chroma C* of at least more than 50.

A pigmented aqueous ink may comprise a biocide and/or at least one pH adjuster, such as NaOH, KOH, $NEt_3$, $NH_3$, HCl. Preferred pH adjusters are triethanol amine, NaOH and $H_2SO_4$.

Preparation of Pigmented Aqueous Inks

The one or more aqueous inkjet inks may be prepared by precipitating or milling the colour pigment in the dispersion medium in the presence of the polymeric dispersant, or simply by mixing a self-dispersible colour pigment in the ink. Mixing apparatuses may include a pressure kneader, an open kneader, a planetary mixer, a dissolver, and a Dalton Universal Mixer. Suitable milling and dispersion apparatuses are a ball mill, a pearl mill, a colloid mill.

If the inkjet ink contains more than one pigment, the colour ink may be prepared using separate dispersions for each pigment, or alternatively several pigments may be mixed and co-milled in preparing the dispersion. The dispersion process can be carried out in a continuous, batch or semi-batch mode. The milling time can vary widely and depends upon the pigment, selected mechanical means and residence conditions, the initial and desired final particle size, etc. In the present invention, pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like.

Polymer Latex Binders

One or more of the aqueous inkjet inks may contain a polymer latex binder, preferably a polyurethane based latex. It was observed that polyurethane based latex are less detrimental for adhesion in flooring laminates than acrylic latex binders.

The polymer latex binder is not particularly limited as long as it has stable dispersibility in the ink composition. There is no limitation on the main chain skeleton of the water-insoluble polymer.

In the preferred embodiment, the polymer latex is a polyurethane latex, more preferably a self-dispersible polyurethane latex. The polymer latex binder in the one or more aqueous inkjet inks is preferably a polyurethane based latex binder for reasons of compatibility with the thermosetting resin; when used in the manufacturing of decorative surfaces.

The latex binder polymer particles preferably have a glass transition temperature (Tg) of 30° C. or more. The minimum film-forming temperature (MFT) of the polymer latex is preferably −25 to 150° C., and more preferably 35 to 130° C.

Jetting Viscosity and Jetting Temperature

The jetting viscosity is measured by measuring the viscosity of the liquid at the jetting temperature. The jetting viscosity may be measured with various types of viscometers such as a Brookfield DV-II+ viscometer at jetting temperature and at 12 rotations per minute (RPM) using a CPE 40 spindle which corresponds to a shear rate of 90 s−1 or with the HAAKE Rotovisco 1 Rheometer with sensor C60/1 Ti at a shear rate of 1000 s$^{-1}$.

In a preferred embodiment, the jetting viscosity is from 10 mPa·s to 200 mPa·s more preferably from 25 mPa·s to 100 mPa·s and most preferably from 30 mPa·s to 70 mPa·s.

The jetting temperature may be measured with various types of thermometers. The jetting temperature of jetted liquid is measured at the exit of a nozzle in the printhead while jetting or it may be measured by measuring the temperature of the liquid in the liquid channels or nozzle while jetting through the nozzle. In a preferred embodiment, the jetting temperature is from 10° C. to 100° C. more preferably from 20° C. to 60° C. and most preferably from 30° C. to 50° C.

Inkjet Printhead Unit

An inkjet printhead unit is a unit, which comprises a plurality of inkjet printheads. A printhead is a means for jetting a liquid on a substrate through a nozzle. The nozzle may be comprised in a nozzle plate, which is attached to the printhead. A plurality of nozzles in a printhead forms one or more nozzle rows. The inkjet printhead unit in the present invention is attached to a marking device to mark by inkjet technology a wood pattern ($W_{i,j}$) on a substrate. The marking device is preferably capable of marking substrate with a width between 1 meter and 5 meter and if the substrate is not a web but a sheet, the marking device is preferably capable of marking substrates with a height between 1 meter and 10 meter. More information about inkjet technology, incorporate printheads into an inkjet printhead unit and marking devices, which uses inkjet technology, are disclosed in STEPHEN F. POND. Inkjet Technology and Product Development Strategies. USA: Torrey Pines Research, 2000.

In the present invention is the wood pattern rendered in a plurality of passes by inkjet technology because rendering a wood pattern in one pass by inkjet technology suffers in daily production of wood simulated decorative surfaces from operation failures such as failing nozzles in the inkjet printhead unit, thereby creating 'empty' line artefacts in the rendered wood pattern and leading to waste of material by a cumbersome removal of these defective decorative laminates after heat pressing. These marking devices contain a serious amount of inkjet print heads in the inkjet printhead unit to cover the whole width of the substrate, which makes it a very costly machine. Another operation failure is the generation of adjacent regions with luminance differences inside rendered wood patterns and between copies of the same rendered wood pattern or copies of rendered wood pattern with the same background color. These adjacent regions are mainly elongated rectangular bands. Each print head of the serious amount of inkjet print heads have to be controlled ('tuned') to render the same densities. The control and calibration to tuned inkjet print heads asks for a big effort for the operator; which have to be redone when an inkjet print head is replaced; which results in a longer down-time of the marking device. It is found that densities depends also on the temperature of the inkjet print heads and the applied voltage on the inkjet print heads.

A printhead may be any type of inkjet head such as a Valvejet printhead, piezoelectric inkjet printhead, thermal inkjet printhead, a continuous inkjet printhead type, electrostatic drop on demand inkjet printhead type or acoustic drop on demand inkjet printhead type or a page-wide inkjet printhead array, also called a page-wide inkjet array.

The printhead of the present invention is preferably suitable for jetting a liquid having a jetting viscosity of 8 mPa·s to 3000 mPa·s. A preferred printhead is suitable for jetting a liquid having a jetting viscosity of 20 mPa·s to 200 mPa·s; and more preferably suitable for jetting a liquid having a jetting viscosity of 50 mPa·s to 150 mPa·s.

It is found that not each nozzle from an inkjet printhead, such as a piezoelectric inkjet printhead jets the same volume of droplet when the nozzle is actuated by the same manner. Small density-differences occur between jetted droplets from nozzles from an inkjet print head unit. If the actuation per nozzle or group of nozzles can be adapted than these small density-differences can be controlled, else the density-differences may be compensated in the wood simulation method of the present invention. The density differences cause also adjacent regions with differential gloss, luminance and/or chroma.

Probably these density-differences is caused by manufacturing reasons of the nozzles and inkjet printhead. The compensation may be performed before the halftoning of each sub-image, according to the present invention. The disadvantage of doing the compensation before the halftoning is that it is a time-consuming action, which have to be redone if the sub-image is printed by other nozzles. There is need to a correlation between pixels of the sub-image and the nozzle, which shall rendering the sub-image. If this correlation is changed for example by rendering the sub-image on a another place of the substrate as intended.

The compensation is thus preferably performed after the halftoning of each sub-image; according to the present invention by applying a sigma-delta modulation on the halftoned sub-image as compensation function whereby measured density-differences are taken into account. The measuring of the density-differences between nozzles may be done by scanning a test-patterns on an off-line scanner or by capturing by a camera system on-the-fly while rendering the wood-pattern and/or test-patterns.

The sigma-delta modulation, similar as error diffusion, is an image manipulation method wherein a quantization residual is distributed to neighboring pixels that have not yet been processes.

The scanned test-pattern and/or wood-pattern or captured test-pattern and/or wood-pattern is analysed to calculate the density-differences between nozzles. From the density-differences the compensation factors are calculated and added or subtracted in the sigma-delta modulation.

To avoid patterning in the compensated halftoned sub-image, a random seed is preferably used as starting value of the sigma-delta modulation. The camera system is preferably a single-line, whether or not monochromatic, CCD-based or CMOS-based camera.

Piezoelectric Inkjet Printheads

A preferred printhead for the present invention is a piezoelectric inkjet printhead. Piezoelectric inkjet printhead, also called piezoelectric inkjet printhead, is based on the movement of a piezoelectric ceramic transducer, comprised in the printhead, when a voltage is applied thereto. The application of a voltage changes the shape of the piezoelectric ceramic transducer to create a void in a liquid channel, which is then filled with liquid. When the voltage is again removed, the ceramic expands to its original shape, ejecting a droplet of liquid from the liquid channel.

The droplet forming means of a piezoelectric inkjet printhead controls a set of piezoelectric ceramic transducers to apply a voltage to change the shape of a piezoelectric ceramic transducer. The droplet forming means may be a squeeze mode actuator, a bend mode actuator, a push mode actuator or a shear mode actuator or another type of piezoelectric actuator.

The piezoelectric inkjet printhead is preferably a through-flow piezoelectric inkjet printhead. In a preferred embodiment the recirculation of the liquid in a through-flow piezoelectric inkjet printhead flows between a set of liquid channels and the inlet of the nozzle wherein the set of liquid channels corresponds to the nozzle.

In a preferred embodiment in a piezoelectric inkjet printhead the minimum drop size of one single jetted droplet is from 0.1 pL to 300 pL, in a more preferred embodiment minimum drop size is from 1 pL to 30 pL, in a most preferred embodiment the minimum drop size is from 1.5 pL to 15 pL. By using grayscale inkjet head technology multiple single droplets may form larger drop sizes.

In a preferred embodiment the piezoelectric inkjet printhead has a drop velocity from 3 meters per second to 15 meters per second, in a more preferred embodiment the drop velocity is from 5 meters per second to 10 meters per second, in a most preferred embodiment the drop velocity is from 6 meters per second to 8 meters per second.

In a preferred embodiment the piezoelectric inkjet printhead has a native print resolution from 25 DPI to 2400 DPI, in a more preferred embodiment the piezoelectric inkjet printhead has a native print resolution from 50 DPI to 2400 DPI and in a most preferred embodiment the piezoelectric inkjet printhead has a native print resolution from 150 DPI to 3600 DPI. DPI is the abbreviation of dots per inch, which is a well-known measure of spatial printing, in particular the number of individual dots that can be place in a line within the span of 1 inch, which is 2.54 cm.

In a preferred embodiment with the piezoelectric inkjet printhead the jetting viscosity is from 8 mPa·s to 200 mPa·s more preferably from 25 mPa·s to 100 mPa·s and most preferably from 30 mPa·s to 70 mPa·s.

In a preferred embodiment with the piezoelectric inkjet printhead the jetting temperature is from 10° C. to 100° C. more preferably from 20° C. to 60° C. and most preferably from 30° C. to 50° C.

The nozzle spacing distance of the nozzle row in a piezoelectric inkjet printhead is preferably from 10 μm to 200 μm; more preferably from 10 μm to 85 μm; and most preferably from 10 μm to 45 μm.

Movable Inkjet Printhead Units

In a preferred wood simulation method is the substrate stationary while jetting a pass from the plurality of passes $(P_1 \ldots {}_L)$ and moves a first and second inkjet printhead unit from the N inkjet printhead units $(U_1 \ldots {}_N)$ in a scan-movement, preferably in a back-and-forth-movement, while jetting; and wherein both inkjet printhead units comprise a nozzle row for each ink of the M inks $(I_1 \ldots {}_M)$, wherein the nozzle row is perpendicular oriented to the scan-movement. The substrate may move by discrete distances between the plurality of passes $(P_1 \ldots {}_L)$ thus between jetting of two succeeding passes. The direction of the discrete distance movements is perpendicular oriented to the scan-movement. The substrate may remain stationary and a beam, whereon the plurality of inkjet printhead units $((U_1 \ldots {}_N)$ moves back-and-forth, moves by discrete distances between the plurality of passes thus between jetting of two succeeding passes. The direction of the discrete distance movements is perpendicular oriented to the scan-movement.

Examples of a configuration in preferred marking device, wherein the arrows (←, →) shows the back-and-forth-movement:

(example 1.1)
```
        U1      U2
<- |Dryer| |CMYK| |CMYK| |Dryer| ->
```

(example 1.2)
```
        U1      U2
<- |Dryer| |CRYK| |CRYK| |Dryer| ->
```

(example 1.3)
```
        U1      |U2
   |D| |CRYK| CRYK| |D|
   |r| |CRYK| |CRYK| |r|
<- |y| |CRYK| |CRYK| |y| ->
   |e| |CRYK| |CRYK| |e|
   |r| |CRYK| |CRYK| |r|
```

C, M, R, Y and K stays for one printhead wherein one or more nozzle rows may jet respectively cyan, magenta, red, yellow and black. The nozzle rows are oriented perpendicular to the scan-movement.

Example 1.3 shows a configuration wherein a plurality of inkjet heads for the same ink are positioned in a column for rendering broader strokes of the wood pattern and thus for faster rendering the wood pattern.

More preferably forms nozzle rows for the set of the M inks ($I_1 \ldots _M$) in the first inkjet printhead unit a color-sequence; and nozzle rows for the set of the M inks ($I_1 \ldots _M$) in the second inkjet printhead unit an other color-sequence, which is mirrored to the color-sequence. Most preferably, the color sequence is YMCK, YRCK, YCMK or YCRK, wherein C stays for cyan, M for magenta, Y for yellow, K for black.

The color-sequence and the mirrored color-sequence have a big advantage to reduce the adjacent regions with gloss, luminance and/or chroma difference in the rendered wood pattern because the time-of-drying becomes for each color in the first inkjet printhead unit the same as in the second inkjet printhead. The time-of-drying is the time between jetting a droplet of a determined volume and the moment when the jetted droplet is dried. A droplet that is jetted on a substrate makes an impact on the substrate, which can cause a bounce that influences the size of the jetted droplet after drying. The droplet may be absorbed in the substrate, which can influence the size of the jetted droplet after drying. The droplet may be wetted or de-wetted on the substrate, for example by dynamic surface tensions on the substrate, which can influence the size of the jetted droplet after drying. It is found, if the time-of-drying of a black jetted droplet is in the first inkjet printhead unit larger than in the second inkjet printhead unit, the differences in the adjacent regions of the rendered wood image is enlarged. By mirroring the color sequence between the first and second inkjet printhead unit, this issue is solved. A color sequence wherein the color of the inks are ordered on luminance seems to be even more advantageous. Ordering inks on luminance is easily done by measuring the L* value in the CIE Lab-colorspace and ordering the inks based on the L* value. The heads comprising ink with highest luminance is preferably positioned at the outside of the first color-sequence to get for this ink the largest time-of-drying. It is found that due to the high luminance, the ink is less responsible for the adjacent regions with gloss, luminance and/or chroma difference in the rendered wood pattern.

Examples of a configuration in preferred marking device, wherein the arrows (←, →) shows the back-and-forth-movement:

```
         U1    U2              (example 2.1)
<- |Dryer| |CMYK| |KYMC| |Dryer| ->

U1    U2              (example 2.2)
<- |Dryer| |CRYK| |KYRC| |Dryer| ->

U1    U2              (example 2.3)
    |D| |YCRK| |KRCY| |D|
    |r| |YCRK| |KRCY| |r|
 <- |y| |YCRK| |KRCY| |y| ->
    |e| |YCRK| |KRCY| |e|
    |r| |YCRK| |KRCY| |r|
```

C, M, R, Y and K stays for one printhead wherein one or more nozzle rows may jet respectively cyan, magenta, red, yellow and black. The nozzle rows are oriented perpendicular to the scan-movement. A nozzle rows for an ink in an inkjet printhead unit is aligned to a corresponding nozzle row for the ink in the other inkjet printhead units. Theoretically shall a droplet according to the value of a pixel from the first sub-image and droplets according to the value of corresponding pixels from the other sub-images be jetted on top of each other.

Example 2.3 shows a configuration wherein a plurality of inkjet heads for the same ink are positioned in a column for rendering broader strokes of the wood pattern and thus for faster rendering the wood pattern.

Probably by the splitting the wood pattern, while rendering in a plurality of sub-images and halftoning with another halftoning method, the mixture of droplets on the substrate is more scattered and the adjacent regions with gloss, luminance and/or chroma difference in the rendered wood pattern is reduced. It is also not visible after heat-pressing the rendered wood pattern as in the disclosed preferred manufacturing of decorative surfaces. The other halftoning method is probably performed by using another halftone parameter such as another set of seeds when FM screening is used.

The plurality of passes is preferably two, three or four passes to minimize the production time of manufacturing decorative surfaces. To reduce the adjacent regions with gloss, luminance and/or chroma differences occurring due rendering a wood pattern in a plurality of passes ($P_1 \ldots _L$) by inkjet technology, the amount of passes may be enlarged, by adding method of print masking, such as a method of shingling and interlacing, in the rendering step for the first and second sub-image. The method of print masking divides the first sub-image in L smaller sub-images wherein each of the smaller sub-images is printed in a different pass and the second sub-image in another L smaller sub-images wherein each of the smaller sub-images is printed in a different pass. A typical method of print masking is the use of a checkerboard or variants of it, but also blue noise thresholds may be used.

The mixing of the plurality of sub-images, generated by the method print masking reduces the gloss, luminance and/or chroma difference in adjacent regions of a rendered wood pattern already beneficial but not enough in rendered wood patterns and decorative surfaces. It is even found that that after heat-pressing the differences in adjacent regions is even more accentuated probably due to enhancement of color gamut and/or changes in the color gamut after heat-pressing.

Stationary Inkjet Printhead Units

In a preferred wood simulation method moves the substrate in a print direction and are a first and second inkjet printhead unit from the N inkjet printhead units ($U_1 \ldots _N$) stationary; and wherein both inkjet printhead units comprise a nozzle row for each ink of the M inks ($I_1 \ldots _M$), wherein the nozzle row is perpendicular oriented to the print direction.

Examples of a configuration in preferred marking device, wherein the arrows (↑) shows the print direction, which is the direction the substrate relative moves underneath the inkjet printhead units ($U_1 \ldots _N$):

Example 3.1

```
         ↑
       |-----|
       |Dryer|
       |-----|      ++++>
       |CCCCC|      ++++> U₁
       |MMMMM|      ++++> U₁
       |YYYYY|      ++++> U₁
       |KKKKK|      ++++> U₁
       |+++++|
       |CCCCC|      ++++> U₂
       |MMMMM|      ++++> U₂
       |YYYYY|      ++++> U₂
       |KKKKK|      ++++> U₂
       |-----|
```

Example 3.2

```
         ↑
       |-----|
       |Dryer|
       |-----|
       |CCCCC|      ++++> U₁
       |Dryer|
       |RRRRR|      ++++> U₁
       |Dryer|
       |YYYYY|      ++++> U₁
       |Dryer|
       |KKKKK|      ++++> U₁
       |+++++|
       |KKKKK|      ++++> U₂
       |Dryer|
       |YYYYY|      ++++> U₂
       |Dryer|
       |RRRRR|      ++++> U₂
       |Dryer|
       |CCCCC|      ++++> U₂
       |-----|
```

C, M, R, Y and K stays for one printhead wherein one or more nozzle rows may jet respectively cyan, magenta, red, yellow and black. A nozzle rows for an ink in an inkjet printhead unit is aligned to a corresponding nozzle row for the ink in the other inkjet printhead units. Theoretically a droplet shall according to the value of a pixel from the first sub-image and droplets according to the value of corresponding pixels from the other sub-images be jetted on top of each other.

The advantage in this preferred wood simulation method, such configurations of stationary inkjet printhead units, is that a failing nozzle in one of the inkjet printhead unit may be compensated by jetting the corresponding pixels in another stationary inkjet printhead unit. A preferred embodiment of the wood simulation method comprises the determination of a failing nozzle in the first stationary inkjet printhead unit, for example by a camera system above the rendered wood image or control strip, and the intensity of the corresponding pixels in the first sub-image shall be added to the intensity of the corresponding pixels in the second sub-image or shall be divided over the other sub-images. The camera system is preferably a single-line, whether or not monochromatic, CCD-based or CMOS-based camera.

Probably by the splitting the wood pattern, while rendering in a plurality of sub-images and halftoning with another halftoning method, the mixture of droplets on the substrate is more scattered and the adjacent regions with gloss, luminance and/or chroma difference in the rendered wood pattern is reduced. It is also not visible after heat-pressing the rendered wood pattern as in the disclosed preferred manufacturing of decorative surfaces.

The substrate may move in a back-and-forth movement along the print direction for rendering the wood pattern in the plurality of passes. To reduce the adjacent regions with gloss, luminance and/or chroma differences occurring due rendering a wood pattern in a plurality of passes ($P_{1 \ldots L}$) by inkjet technology, the amount of passes may be enlarged, by adding method of print masking, such as a method of shingling and interlacing, in the rendering step for the first and second sub-image. The method of print masking divides the first sub-image in L smaller sub-images wherein each of the smaller sub-images is printed in a different pass and the second sub-image in another L smaller sub-images wherein each of the smaller sub-images is printed in a different pass. A typical method of print masking is the use of a checker-board or variants of it, but also blue noise thresholds may be used.

More preferably forms nozzle rows for the set of the M inks ($I_{1 \ldots M}$) in the first inkjet printhead unit a color-sequence ordered on luminance; and nozzle rows for the set of the M inks ($I_{1 \ldots M}$) in the second inkjet printhead unit the color-sequence or another color-sequence, which is mirrored to the color-sequence.

REFERENCE SIGNS LIST 100 wood pattern
200 knot
205 zone of wood imperfections
300 background color of wood pattern
400 wood nerve
901 L-axis according to CIELAB
902 b-axis according to CIELAB
903 a-axis according to CIELAB
703 x-axis according to CIE 1931 xy chromaticity space
701 y-axis according to CIE 1931 xy chromaticity space

The invention claimed is:
1. A method of manufacturing decorative panels, the method comprising:
  rendering a wood pattern on a paper to form a decorative layer using a marking device in a plurality of passes, the paper having a paper weight between 50 g/m² and 130 g/m² and a porosity according to Gurley's method (DIN 53120) between 8 and 20 seconds, the marking device including M inks and N inkjet printhead units in which each of the N inkjet printhead units includes the M inks, and the M inks are pigmented aqueous inkjet inks;
  impregnating the decorative layer with a thermosetting resin; and
  heat pressing the impregnated decorative layer together with a core layer to form a decorative panel; wherein the rendering of the wood pattern includes:
    generating N sub-images in which an intensity of each pixel in the wood pattern equals a sum of intensities of corresponding pixels of the N sub-images, an intensity of a pixel from a first sub-image of the N sub-images has a first percentage between 1 and 99 of the intensity of the corresponding pixel in the wood pattern, and an intensity of a pixel from a second sub-image of the N sub-images has a second percentage between 1 and 99 of the intensity of the corresponding pixel in the wood pattern;

halftoning each of the first and second sub-images of the N sub-images in which a minimum of two sub-images are halftoned differently, and transferring each of the first and second halftoned sub-images of the halftoned N sub-images to another inkjet printhead unit of the N inkjet printhead units; and jetting the transferred halftoned N sub-images during the plurality of passes on the paper.

2. The method of manufacturing decorative panels according to claim 1, further comprising:

applying a set of ink receiving layers before jetting the transferred halftoned N sub-images; wherein a total dry weight of the set of ink receiving layers is between 2.0 g/m² and 10.0 g/m².

3. The method of manufacturing decorative panels according to claim 2, wherein a number of the inkjet printhead units in the marking device is two.

4. The method of manufacturing decorative panels according to claim 2, wherein the paper is stationary while a first inkjet printhead unit and a second inkjet printhead unit of the N inkjet printhead units move in a scanning movement direction while jetting; and both of the first and second inkjet printhead units include a nozzle row for each ink of the M inks, and the nozzle row is perpendicular to the scanning movement direction.

5. The method of manufacturing decorative panels according to claim 4, wherein the nozzle rows for the M inks in the first inkjet printhead unit forms a first color sequence; and the nozzle rows for the M inks in the second inkjet printhead unit forms a second color sequence which mirrors the first color sequence, and the first color sequence is YRCK or YCRK.

6. The method of manufacturing decorative panels according to claim 4, wherein the plurality of passes is two, three, or four.

7. The method of manufacturing decorative panels according to claim 5, wherein the plurality of passes is two, three, or four.

8. The method of manufacturing decorative panels according to claim 2, wherein the paper moves in a print direction while a first inkjet printhead unit and a second inkjet printhead unit of the N inkjet printhead units are stationary; and both of the first and second inkjet printhead units include a nozzle row for each ink of the M inks, and the nozzle row is perpendicular to the print direction.

9. The method of manufacturing decorative panels according to claim 8, wherein the nozzle rows for the M inks in the first inkjet printhead unit forms a first color sequence ordered on luminance; and the nozzle rows for the M inks in the second inkjet printhead unit forms the first color sequence or a second color sequence that mirrors the first color sequence.

10. The method of manufacturing decorative panels according to claim 1, wherein the impregnating of the decorative layer provides an amount of thermosetting resin equal to 40% to 250% dry weight of resin as compared to a weight of the paper.

11. The method of manufacturing decorative panels according to claim 2, wherein the impregnating of the decorative layer provides an amount of thermosetting resin equal to 40% to 250% dry weight of resin as compared to a weight of the paper.

12. The method of manufacturing decorative panels according to claim 4, wherein the impregnating of the decorative layer provides an amount of thermosetting resin equal to 40% to 250% dry weight of resin as compared to a weight of the paper.

13. The method of manufacturing decorative panels according to claim 5, wherein the impregnating of the decorative layer provides an amount of thermosetting resin equal to 40% to 250% dry weight of resin as compared to a weight of the paper.

14. The method of manufacturing decorative panels according to claim 8, wherein the impregnating of the decorative layer provides an amount of thermosetting resin equal to 40% to 250% dry weight of resin as compared to a weight of the paper.

15. The method of manufacturing decorative panels according to claim 9, wherein the impregnation step provides an amount of thermosetting resin equaling 40 to 250% dry weight of resin as compared to weight of the paper.

* * * * *